US009614360B2

(12) United States Patent
Soulignac et al.

(10) Patent No.: US 9,614,360 B2
(45) Date of Patent: Apr. 4, 2017

(54) LIGHTNING PROTECTION DEVICE AND METHOD OF PRODUCING SAME

(71) Applicant: HERAKLES, Le Haillan (FR)

(72) Inventors: Thierry Soulignac, Bruges (FR); Florine Bombled, Merignac (FR); Guillaume Sierra, Baziege (FR)

(73) Assignee: HERAKLES, Le Haillan (FR)

( * ) Notice: Subject to any disclaimer, the term of this patent is extended or adjusted under 35 U.S.C. 154(b) by 0 days.

(21) Appl. No.: 14/760,052

(22) PCT Filed: Jan. 9, 2014

(86) PCT No.: PCT/FR2014/050031
§ 371 (c)(1),
(2) Date: Jul. 9, 2015

(87) PCT Pub. No.: WO2014/108639
PCT Pub. Date: Jul. 17, 2014

(65) Prior Publication Data
US 2016/0006232 A1     Jan. 7, 2016

(30) Foreign Application Priority Data

Jan. 10, 2013  (FR) ...................................... 13 00041

(51) Int. Cl.
*H02G 13/00*     (2006.01)
*B64D 45/02*     (2006.01)
(Continued)

(52) U.S. Cl.
CPC ............. *H02G 13/80* (2013.01); *B64D 45/02* (2013.01); *B64G 1/226* (2013.01); *B64G 1/52* (2013.01);
(Continued)

(58) Field of Classification Search
CPC ........ H02G 13/80; H02G 13/00; B64D 45/02; B64G 1/40; B64G 1/22; B64G 1/226;
(Continued)

(56) References Cited

U.S. PATENT DOCUMENTS 2,623,918 A * 12/1952 Hartwell ................ B64D 45/02
                                                        174/2
3,894,608 A *  7/1975 Haenle .................... B60R 16/06
                                                        174/2
(Continued)

FOREIGN PATENT DOCUMENTS

CN    104302548 A     1/2015
EP    1 473 227 A2   11/2004
GB    2 433 467 A     6/2007

OTHER PUBLICATIONS

The First Office Action as issued in Chinese Patent Application No. 201480003873.6, dated Mar. 25, 2016.
(Continued)

*Primary Examiner* — Angel R Estrada
(74) *Attorney, Agent, or Firm* — Pillsbury Winthrop Shaw Pittman LLP

(57) ABSTRACT

A lightning protection device for placing on a structure for protecting, and including a first coating including at least one layer of conductive paint; and a second coating deposited on the surface coating and including a material that is thermally insulating and electrically conductive.

8 Claims, 2 Drawing Sheets

(51) Int. Cl.
  *B64G 1/22* (2006.01)
  *C09D 5/24* (2006.01)
  *F02K 9/97* (2006.01)
  *F02C 7/25* (2006.01)
  *B64G 1/58* (2006.01)
  *B64G 1/52* (2006.01)
  *F02K 1/78* (2006.01)
  *B64G 1/40* (2006.01)

(52) U.S. Cl.
  CPC ............... *B64G 1/58* (2013.01); *C09D 5/24* (2013.01); *F02C 7/25* (2013.01); *F02K 1/78* (2013.01); *F02K 9/974* (2013.01); *B64G 1/40* (2013.01); *F05D 2300/611* (2013.01)

(58) Field of Classification Search
  CPC .... B64G 1/52; B64G 1/58; C09D 5/24; F01D 21/14; F02C 7/25; F02K 9/97; F02K 1/78; F02K 9/974; F05D 2300/611
  USPC .......... 174/2, 5 R, 5 SB, 5 SG, 6, 51, 137 R, 174/138 R, 135, 200; 439/92, 95, 100, 439/108; 361/117
  See application file for complete search history.

(56) References Cited

U.S. PATENT DOCUMENTS

| | | | | |
|---|---|---|---|---|
| 4,237,514 A | * | 12/1980 | Cline | B64D 45/02 361/117 |
| 4,308,568 A | * | 12/1981 | Whewell | H05F 3/025 428/325 |
| 4,429,341 A | * | 1/1984 | King | B64D 45/02 361/117 |
| 4,824,713 A | * | 4/1989 | Brick | B64D 45/02 174/2 |
| 8,962,130 B2 | * | 2/2015 | Kruckenberg | B64D 45/02 428/297.4 |
| 2015/0171612 A1 | | 6/2015 | Soulignac et al. | |

OTHER PUBLICATIONS

International Preliminary Report on Patentability and the Written Opinion of the International Searching Authority as issued in International Patent Application No. PCT/FR2014/050031, dated Jul. 14, 2015.
International Search Report as issued in International Patent Application No. PCT/FR2014/050031, dated Apr. 2, 2014.

* cited by examiner

LIGHTNING PROTECTION DEVICE AND METHOD OF PRODUCING SAME

CROSS REFERENCE TO RELATED APPLICATIONS

This application is the U.S. National Stage of PCT/FR2014/050031 filed Jan. 9, 2014, which in turn claims priority to French Application No. 1300041, filed Jan. 10, 2013. The contents of both applications are incorporated herein by reference in their entirety.

BACKGROUND OF THE INVENTION

The present invention relates to the field of protection against lightning for use in high temperature environments. A particular but non-exclusive field of the present invention is that of providing protection against lightning for hot parts present in thrusters for space launchers, tactical launchers, etc., or in aeroengines.

The thrusters of launchers of that type or the afterbody parts of aeroengines are liable to be struck by lightning in flight. When a part that is struck by lightning is made of a material that is not conductive, such as a composite material, or when it is covered in a dielectric material, the structure of the part may be severely damaged by the impulse and continuous components of the electric arc created by the lightning.

Several techniques already exist for providing protection against lightning, with the main purpose of encouraging the lightning current to flow through the protection instead of through the structure for protecting and to increase rapidly the size of the impact point of the lightning arc so as to reduce thermal and mechanical stresses.

Among existing solutions, there are to be found lightning protective coatings that are constituted by:
- metallic fabrics fastened to the surface of the part for protecting;
- expanded metal grids made from a metal sheet that has been slotted and stretched in order to form a grid that is likewise fastened to the surface of the part to be protected;
- conductive layers made by depositing metal particles, e.g. nickel particles, on the surface of the part to be protected in order to increase its conductivity; and
- metallic fibers woven directly in the fiber texture of the reinforcement of the composite material part for protecting so as to form a multitude of small points at the surface of the part suitable for dispersing the impact point of the lightning arc.

Nevertheless, those various coatings present certain drawbacks, and the major drawback is poor ability to withstand high temperatures. In addition, some of those coatings are difficult to put into place on structures that are complex in shape.

Those solutions also present the drawback of being difficult to repair.

OBJECT AND SUMMARY OF THE INVENTION

Consequently, the present invention seeks to propose a solution for providing lightning protection for structures that are not conductive or that are covered in a dielectric, and to do so in a manner that is reliable in a high temperature environment.

For this purpose, the invention proposes a lightning protection device for placing on a structure for protecting and comprising at least:
- a first coating comprising at least one layer of conductive paint; and
- a second coating deposited on the first coating and comprising a material that is thermally insulating and electrically conductive.

This provides protection that is effective against an attack by lightning, in particular because a conductive paint is used that is capable of rapidly discharging a large quantity of current when struck by lightning.

In addition, because of the presence of a second coating that is thermally insulating, the integrity of the protection device of the invention is preserved, even when it is used on structures that are exposed to high thermal fluxes. Since the protective coating is also electrically conductive, it contributes to the overall electrical effectiveness of the device by ensuring electrical continuity between the exposed surface of the device and the conductive paint.

Furthermore, by its design, the device can be adapted to any type of shape, even shapes that are very complex.

In a first aspect of the device of the invention, the second coating presents thermal conductivity of less than 0.1 watts per meter per kelvin ($Wm^{-1}K^{-1}$).

In a second aspect of the device of the invention, the second coating presents surface resistivity of less than 200 ohms.

The invention also provides a lightning-sensitive structure that is to operate in high temperature environments, said structure being characterized in that at least a portion thereof is provided with a lightning protection device of the invention. The structure corresponds in particular to a nozzle, an afterbody, or a shroud of a thruster.

The invention also provides a method of making a lightning protection device on a structure for protecting, said method comprising at least:
- depositing on the structure for protecting a first coating comprising at least one layer of conductive paint;
- depositing a second coating on the first coating, the second coating comprising a material that is thermally insulating and electrically conductive.

In a first aspect of the method of the invention, the second coating presents thermal conductivity of less than 0.1 $Wm^{-1}K^{-1}$.

In a second aspect of the method of the invention, the second coating presents surface resistivity of less than 200 ohms.

In addition, the method of the invention may also be used advantageously for repairing the coating of the invention, where such repair is then particularly easy to perform.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The lightning protection device of the invention is preferably, but not exclusively, for use on any structure made of a material that does not conduct electricity or that is covered on its surface(s) for protecting in an electrically insulating material or layer, as applies for example to the thermal protective coatings used on launchers, and the structure is also for use in high temperature environments.

A method of fabricating a lightning protection device in accordance with an embodiment of the invention is described with reference to FIGS. 1 and 2A to 2E.

Figure 1:
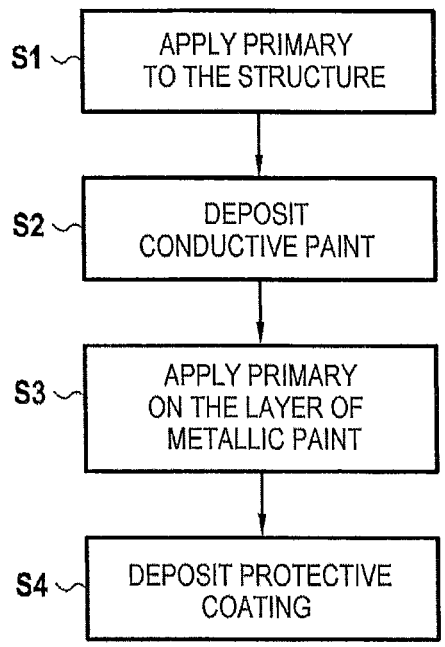
FIG. 1 is a flow chart showing the steps of a method of fabricating a lightning protection device of the invention as shown in FIGS. 2A to 2E.
Figure 2A:
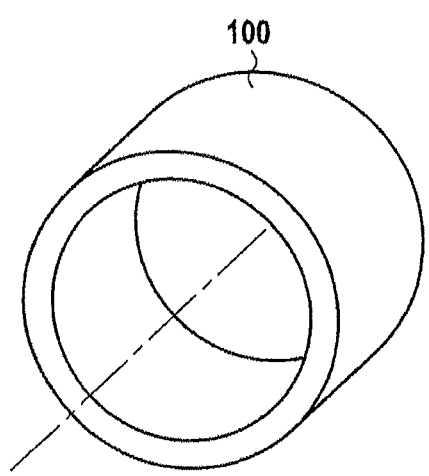
FIGS. 2A to 2E are diagrammatic views of a method of fabricating a lightning protection device in an implementation of the invention.
Figure 2B:
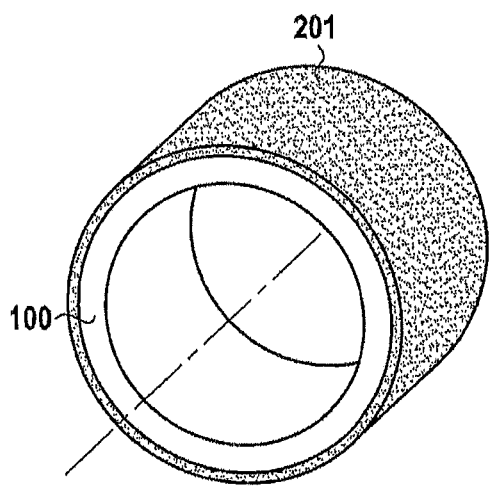

FIG. 2A shows an axisymmetric part 100 corresponding to a structure that is to be protected against lightning. The part 100 is made of a thermostructural composite material that does not conduct electricity, e.g. corresponding to a subassembly of a rocket engine or of an aeroengine that is exposed to the high temperatures generated by the hot gas coming from the engine.

By way of example, the part 100 is made of a silicon carbide/silicon carbide (SiC/SiC) composite material that, in known manner, is a material comprising reinforcement of SiC fibers densified by an SiC matrix. Thermostructural composite materials, such as SiC/SiC material, are characterized by their strong mechanical properties that make them suitable for constituting structural parts, and also by their capacity to conserve their mechanical properties at high temperatures.

The part 100, having its outside surface constituted by a material that does not conduct electricity, might be struck by lightning. In the event of the part being struck by lightning, or of the assembly in which the part is incorporated being struck by lightning, the electric arc that is formed in this way can lead to the part being damaged or destroyed (by effects that may be direct or indirect). The same applies to the dielectric coatings present on the surfaces of structures to be protected.

For this purpose, and in an embodiment of the invention, a lightning protection device suitable for withstanding high temperatures is formed on the outside surface of the part 100, which in this example corresponds to the portion of the part 100 that is to be protected against lightning.

Figure 2C:
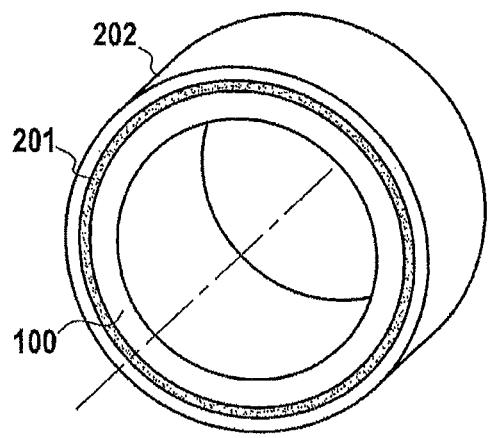

The protection device is made initially by depositing a layer of metallic or electrically conductive paint 202, referred to below in this specification as "conductive paint", on the outside surface of the part 100 for protecting (step S2, FIG. 2C). In the presently-described example, a layer of a primer 201, e.g. a silane-ethanol type bonding primer, is deposited beforehand on the surface of the part 100 in order to enhance adhesion of the conductive paint (step S1, FIG. 2B). Nevertheless, when the part for protecting presents a surface state that is compatible with keying a metallic paint, there is no need to begin by depositing a primer and the conductive paint may be deposited directly on the surface of the part.

The conductive paint, and the primer if any, may be deposited by pneumatic spraying or manually. The conductive paint may be constituted by an acrylic resin incorporating pigments based on metallic particles such as, for example, particles of: silver; aluminum; copper; etc.; the paint possibly being diluted in ketone solvents before being applied. A paint of such a composition (acrylic resin, silver pigment, and mixtures of ketone solvents) is present in particular in the products Mapelec® SSS-47 or Mapelec® SSS-02 sold by the supplier MAP.

In addition, a plurality of layers of conductive paint may be deposited consecutively in order to obtain the thickness desired for the layer, and consequently to obtain the design value for conductivity per unit area.

Figure 2D:
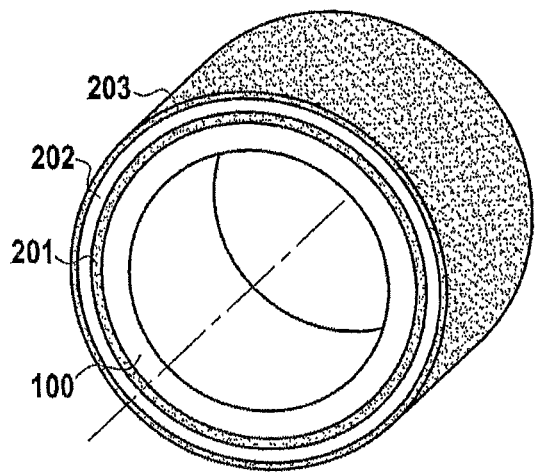
Figure 2E:
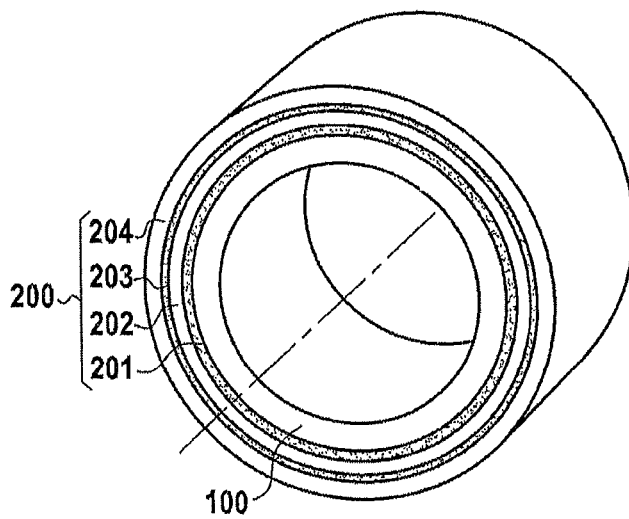

The preparation of the protection device continues by depositing a protective coating 204 on the layer of conductive paint 202 (step S4, FIG. 2E). The protective coating 204 is both thermally insulating in order to protect the conductive paint from the surrounding heat fluxes and electrically conductive in order to enhance electrical conduction with the paint. The protective coating 204 preferably presents thermal conductivity of less than 0.1 $Wm^{-1}K^{-1}$ and surface resistivity of less than 200 ohms (or 200 ohms per square). It may be deposited as a plurality of successive layers in order to obtain the desired thickness, and consequently the design conductivity per unit area. The protective coating 204 may be made in particular using a silicone resin loaded with electrically conductive particles such as particles of silver or a mixture of functionalized silicone polymers, of a conductive filler (QS 1123 Elec LD) and of ketone solvents.

In the presently-described example, a layer of a primer 203, e.g. an epoxy primer filled with electrically conductive particles or a primer constituted by a mixture of functionalized silanes and of ethanol available under the reference Mapsil® P255 from the supplier MAP, is preferably deposited on the layer of conductive paint 202 in order to enhance the adhesion of the protective coating 204 (step S3, FIG. 2D).

As shown in FIG. 2E, a protection device 200 is then obtained on the surface 100a of the part 100, the device comprising:
  a first coating constituted in this example by a first primer 201, a layer of metallic paint 202, and a second primer 203; and
  a second coating 204 protecting the first coating from surrounding heat fluxes.

The thickness of the protective layer may lie in the range 30 micrometers (μm) to 60 μm, while the or each primer may have thickness of about 1 millimeter (mm). The second coating protecting the first coating from surrounding thermal fluxes may have thickness lying in the range 1 mm to 5 mm.

The invention claimed is:

1. A lightning protection device for placing on a structure for protecting, said device comprising:
  a first coating comprising at least one layer of conductive paint; and
  a second coating deposited on the first surface coating and comprising a material that is thermally insulating and electrically conductive.

2. A device according to claim 1, wherein the second coating presents a thermal conductivity of less than 0.1 $Wm^{-1}K^{-1}$.

3. A device according to claim 2, wherein the second coating presents a surface resistivity of less than 200 ohms.

4. A lightning-sensitive structure that is to operate in high temperature environments, wherein at least a portion thereof is provided with a lightning protection device according to claim 1.

5. A structure according to claim 4, wherein the structure constitutes at least one of the following thruster elements: a nozzle; an afterbody; and a shroud.

6. A method of making a lightning protection device on a structure for protecting, said method comprising:
  depositing on the structure for protecting a first coating comprising at least one layer of conductive paint;
  depositing a second coating on the first coating, the second coating comprising a material that is thermally insulating and electrically conductive.

7. A method according to claim 6, wherein the second coating presents a thermal conductivity of less than 0.1 $Wm^{-1}K^{-1}$.

8. A method according to claim 6, wherein the second coating presents a surface resistivity of less than 200 ohms.

* * * * *